US012679389B2

(12) United States Patent
Armiyoon et al.

(10) Patent No.: US 12,679,389 B2
(45) Date of Patent: Jul. 14, 2026

(54) GAIN OPTIMIZATION AND SELECTION FOR VEHICLE SYSTEMS

(71) Applicant: GM GLOBAL TECHNOLOGY OPERATIONS LLC, Detroit, MI (US)

(72) Inventors: Ali Reza Armiyoon, Markham (CA); Paul Guillermo Otanez, Franklin, MI (US); Hualin Tan, Highland, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 68 days.

(21) Appl. No.: 18/825,535

(22) Filed: Sep. 5, 2024

(65) Prior Publication Data

US 2026/0062013 A1 Mar. 5, 2026

(51) Int. Cl.
*B60W 50/00* (2006.01)

(52) U.S. Cl.
CPC . *B60W 50/0098* (2013.01); *B60W 2050/0024* (2013.01); *B60W 2520/125* (2013.01); *B60W 2520/26* (2013.01); *B60W 2552/40* (2020.02)

(58) Field of Classification Search
CPC ..... B60W 50/0098; B60W 2050/0024; B60W 2520/125; B60W 2520/26; B60W 2552/40; B60W 2050/0022
See application file for complete search history.

(56) References Cited

U.S. PATENT DOCUMENTS

| | | | | |
|---|---|---|---|---|
| 5,278,761 A | * | 1/1994 | Ander | B60K 28/16 701/84 |
| 6,606,549 B1 | * | 8/2003 | Murakami | B60K 23/0808 477/80 |

| | | | | |
|---|---|---|---|---|
| 2018/0292824 A1 | * | 10/2018 | Kazemi | B60W 30/00 |
| 2021/0245732 A1 | * | 8/2021 | Nahidi | B60K 17/22 |
| 2022/0169268 A1 | * | 6/2022 | Chiba | G05B 13/0265 |
| 2025/0236314 A1 | * | 7/2025 | Buyval | G06N 7/01 |

FOREIGN PATENT DOCUMENTS

| | | |
|---|---|---|
| CN | 115571133 A | 1/2023 |
| DE | 102010008695 A1 | 8/2011 |
| DE | 102020203742 A1 | 9/2021 |
| DE | 102021126082 A1 | 4/2023 |
| DE | 112011104550 B4 | 7/2024 |

OTHER PUBLICATIONS

German Office Action from counterpart DE1020241299622, dated Mar. 13, 2025.

* cited by examiner

*Primary Examiner* — Abby Lin
*Assistant Examiner* — Karston G. Evans

(57) ABSTRACT

A vehicle system for selecting a gain set for controlling a vehicle includes a plurality of sensors configured to detect one or more vehicle characteristics and a control module. The control module is configured to optimize a plurality of gain sets for a plurality of different driving conditions, each gain set including one or more values representing a relationship between an input to the control module and an output of the control module, determine a current driving condition associated with the vehicle based on the one or more vehicle characteristics, select a gain set of the plurality of optimized gain sets based on the current driving condition associated with the vehicle, and generate a control signal based on one or more values of the selected gain set for controlling at least one operation of the vehicle. Other example vehicle systems and control methods are also disclosed.

20 Claims, 6 Drawing Sheets

GAIN OPTIMIZATION AND SELECTION FOR VEHICLE SYSTEMS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to gain optimization and selection for vehicle systems.

Vehicles include control systems for controlling different vehicle operations, such as a motion and/or a trajectory. For instance, some vehicles (e.g., autonomous vehicles, semi-autonomous vehicles, etc.) may rely on sensor feedback to plan and/or control vehicle movement, such as accelerating, decelerating, turning, changing lanes, etc. In some cases, vehicles may utilize a set of system gains for such vehicle control. For example, a vehicle control system may be provided with a set of system gains that are used for velocity estimation across various different driving conditions.

SUMMARY

A vehicle system for selecting a gain set for controlling a vehicle, includes a plurality of sensors configured to detect one or more vehicle characteristics, and a control module in communication with the plurality of sensors. The control module is configured to optimize a plurality of gain sets for a plurality of different driving conditions, each gain set including one or more values representing a relationship between an input to the control module and an output of the control module, determine a current driving condition associated with the vehicle based on the one or more vehicle characteristics, select a gain set of the plurality of optimized gain sets based on the current driving condition associated with the vehicle, and generate a control signal based on one or more values of the selected gain set for controlling at least one operation of the vehicle.

In other features, the control module is configured to receive data sets associated with the plurality of driving conditions and optimize, with an optimization algorithm, a cost function based on a performance of an estimator for the plurality of gain sets for the plurality of driving conditions based on the received data sets.

In other features, the data sets include a lateral vehicle acceleration value and a vehicle wheel slip ratio value for each driving condition.

In other features, the control module is configured to determine optimal values for the plurality of gain sets based on a cost function equation having a correlation coefficient and a root mean squared error (RMSE) component.

In other features, the control module is configured to detect a singularity in a portion of the data sets and prevent the optimization algorithm from utilizing the portion of an optimization space when determining the optimal values for the plurality of gain sets based on the cost function equation.

In other features, the control module includes a first model and a second model, and the control module is configured to separately optimize a first subset of the plurality of gain sets for the first model and a second subset of the plurality of gain sets for the second model.

In other features, the first model is a dynamic model and the second model is a kinematic model.

In other features, the control module is configured to freeze the first subset of the plurality of gain sets and optimize the second subset of the plurality of gain sets for the second model while the first subset are frozen.

In other features, the control module is configured to determine a first vehicle control state using the first model based on the first subset of the plurality of gain sets, determine a second vehicle control state using the second model based on the first vehicle control state and the second subset of the plurality of gain sets, and generate the control signal based on the second vehicle control state.

In other features, the second vehicle control state is a lateral velocity estimate.

In other features, the current driving condition is a first current driving condition and the gain set of the plurality of optimized gain sets is a first gain set.

In other features, the control module is configured to determine a second current driving condition associated with the vehicle based on the one or more vehicle characteristics, select a second gain set of the plurality of optimized gain sets based on the determined second driving condition associated with the vehicle, blend the first gain set into the second gain set to provide a smooth transition, and generate the control signal based on one or more values of the second gain set for controlling at least one operation of the vehicle.

In other features, the one or more vehicle characteristics include a lateral acceleration value for the vehicle and a slip ratio value for each wheel of the vehicle.

In other features, the driving conditions include one or more of a decreased surface friction coefficient condition, an increased lateral acceleration condition, and a normal driving condition.

A vehicle system for selecting a gain set for controlling a vehicle, includes a plurality of sensors configured to detect one or more vehicle characteristics, and a control module in communication with the plurality of sensors. The control module is configured to receive a plurality of optimized gain sets for a plurality of different driving conditions, each gain set including one or more values representing a relationship between an input to the control module and an output of the control module, determine a current driving condition associated with the vehicle based on the one or more vehicle characteristics, select a gain set of the plurality of optimized gain sets based on the current driving condition associated with the vehicle, and generate a control signal based on one or more values of the selected gain set for controlling at least one operation of the vehicle.

In other features, the control module is a first control module internal to the vehicle, and the vehicle system further includes a second control module external to the vehicle.

In other features, the second control module is configured to optimize the plurality of gain sets for the plurality of different driving conditions and transmit the plurality of optimized gain sets to the first control module.

In other features, the control module includes a first model and a second model, and the gain set includes a first subset for the first model and a second subset for the second model.

In other features, the control module is configured to determine a first vehicle control state using the first model based on the first subset of the gain set, determine a second vehicle control state using the second model based on the first vehicle control state and the second subset of the gain set, and generate the control signal based on the second vehicle control state.

In other features, the first model is a dynamic model and the second model is a kinematic model.

In other features, the current driving condition is a first current driving condition and the gain set of the plurality of optimized gain sets is a first gain set.

In other features, the control module is configured to determine a second current driving condition associated with the vehicle based on the one or more vehicle characteristics, select a second gain set of the plurality of optimized gain sets based on the determined second driving condition associated with the vehicle, blend the first gain set into the second gain set to provide a smooth transition, and generate the control signal based on one or more values of the second gain set for controlling at least one operation of the vehicle.

In other features, the one or more vehicle characteristics include a lateral acceleration value for the vehicle and a slip ratio value for each wheel of the vehicle, and the driving conditions include one or more of a decreased surface friction coefficient condition, an increased lateral acceleration condition, and a normal driving condition.

A control method for selecting a gain set for controlling a vehicle, includes optimizing a plurality of gain sets for a plurality of different driving conditions, determining a current driving condition associated with the vehicle based on one or more vehicle characteristics, selecting a gain set of the plurality of optimized gain sets based on the determined driving condition associated with the vehicle, and generating a control signal based on one or more values of the selected gain set for controlling at least one operation of the vehicle.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Vehicles include control systems for controlling different vehicle operations. Conventionally, vehicles may utilize a set of system gains for such vehicle control across various different driving conditions. For example, a vehicle control system may be provided with a single set of arbitrarily chosen system gains that are used for estimating a vehicle control state (e.g., velocity estimation) across different driving conditions, such as normal operating conditions, low surface friction conditions (e.g., wet, icy, etc. roadways), high lateral acceleration conditions, etc. This one size fits all approach with the same set of arbitrarily selected gains is unsatisfactory for multiple driving conditions. As such, the reliance on one set of gains for different driving conditions having different characteristics results in suboptimal performance in some or all operating conditions.

The vehicle systems and methods according to the present disclosure provide solutions for optimizing multiple sets of gains for a control system across different driving conditions and then selecting one of the sets of optimized gains depending on a current driving condition. For example, the vehicle systems and methods may apply a Particle Swarm Optimization (PSO) method to optimize filter gains (e.g., Kalman filter gains, etc.) for vehicle velocity estimation for different dynamic driving conditions, such as normal operating conditions, low surface friction conditions (e.g., wet, icy, etc. roadways), high lateral acceleration conditions, etc. As further explained herein, this optimization may be executed on the vehicle itself or with an external module. Additionally, in various embodiments, the vehicle systems and methods determine critical driving conditions for velocity estimations or other vehicle control states before optimizing the filter gains for such conditions and/or smoothly transition among optimized gains for different driving conditions in real time. By optimizing multiple sets of gains for a control system across different driving conditions and then selecting an appropriate set of gains, robust and optimal performance of velocity estimations or other vehicle control states for a control system may be realized.

Figure 1:
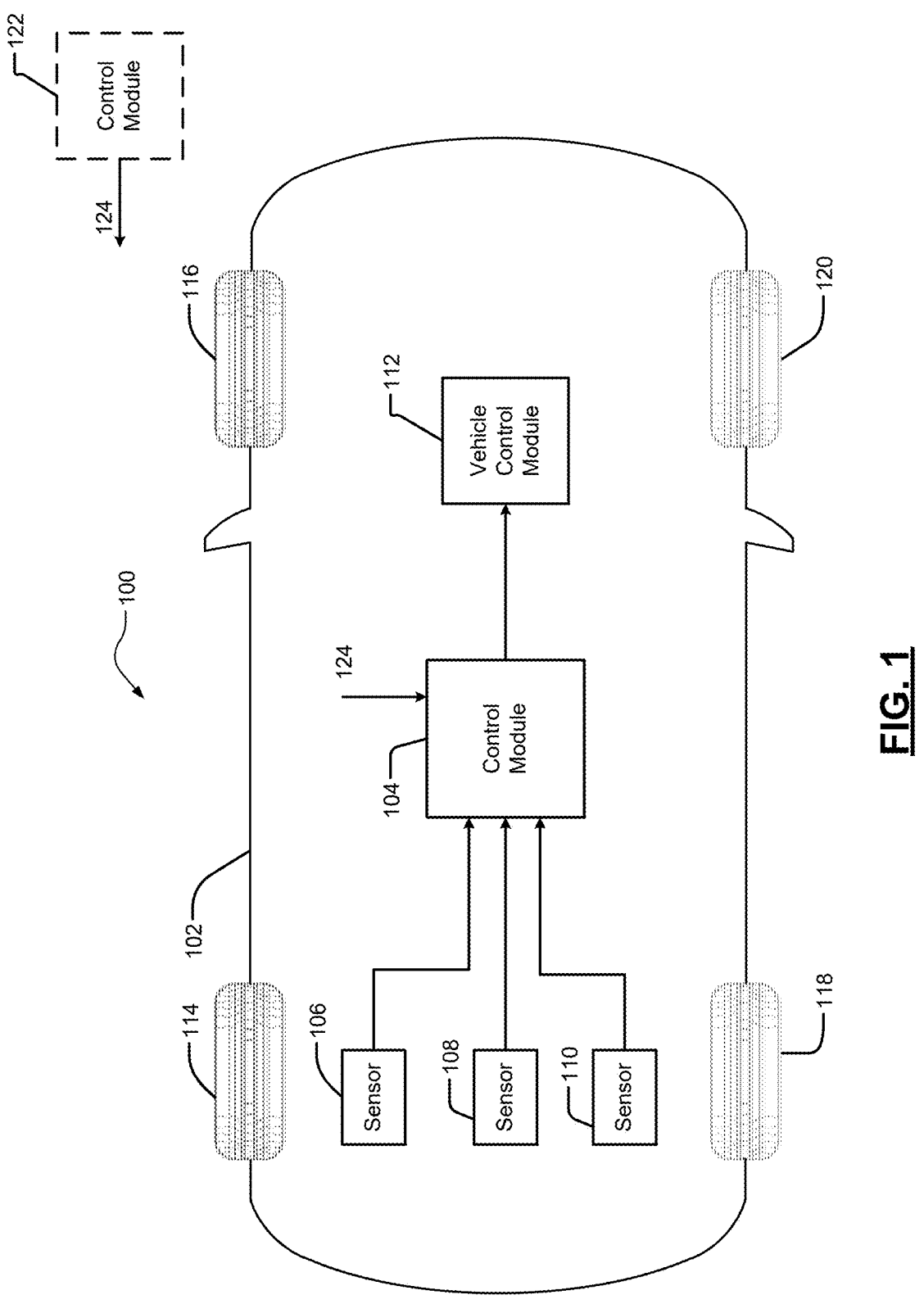
FIG. 1 is a block diagram of an example vehicle system for optimizing gain sets for a control system across different driving conditions and selecting one of the gain sets for a current driving condition to control a vehicle, according to the present disclosure.

Referring now to FIG. 1, a block diagram of an example vehicle system 100 is presented for optimizing gain sets for a control system across different driving conditions and selecting one of the gain sets for a current driving condition to control a vehicle 102. As shown in FIG. 1, the vehicle system 100 generally includes a control module 104 internal to the vehicle 102, multiple sensors 106, 108, 110 positioned on the vehicle 102, and a vehicle control module 112 for controlling at least one operation of the vehicle 102. Although FIG. 1 illustrates the vehicle system 100 as including specific dedicated modules, it should be appreciated that one or more other modules may be employed if desired. For example, any combination of the modules (e.g., the control module 104, the vehicle control module 112, etc.) and/or the functionality thereof may be integrated into a single module or multiple different modules. Additionally, although FIG. 1 illustrates three sensors 106, 108, 110, it should be appreciated that any number of sensors can be arranged on the vehicle 102 if desired.

In the example of FIG. 1, the sensors 106, 108, 110 and the vehicle control module 112 are in communication with the control module 104. In such examples, the modules and sensors of the vehicle system 100 may share parameters via a network, such as a controller area network (CAN) and signals. For example, in FIG. 1, the control module 104 receives signals representing data from the sensors 106, 108, 110 and transmits signals to the vehicle control module 112 for controlling vehicle operation.

The vehicle system 100 of FIG. 1 may be employable in any suitable vehicle, such as an autonomous vehicle, a semi-autonomous vehicle, etc. Additionally, the vehicle system 100 may be applicable to electric vehicles (e.g., a pure electric vehicle, a plug-in hybrid electric vehicle, etc.) and internal combustion engine (ICE) vehicles. In the example of FIG. 1, the vehicle system 100 is employed in the vehicle 102 (e.g., an autonomous vehicle).

In the example of FIG. 1, the sensors 106, 108, 110 may include any suitable sensor for detecting one or more vehicle characteristics. For example, one of the sensors 106, 108, 110 may be a lateral acceleration sensor for detecting a lateral acceleration of the vehicle 102. In some examples, one or more of the sensors 106, 108, 110 may include a yaw rate sensor, a vehicle speed sensor, a steering angle sensor, wheel speed sensors, etc.

In various embodiments, data from the sensors 106, 108, 110 may represent vehicle characteristics and/or be used by the control module 104 to detect vehicle characteristics. For example, in some embodiments, the control module 104 may receive a lateral acceleration ($a_y$) value from the one of the sensors 106, 108, 110. Additionally, the control module 104 may receive wheel speed data and vehicle speed data from one or more of the sensors 106, 108, 110, and then determine wheel slip ratio values for each wheel 114, 116, 118, 120 of the vehicle 102 based on an angular velocity of each wheel and the vehicle speed.

In the example of FIG. 1, the vehicle system 100 optimizes multiple gain sets for a control system (e.g., the control module 104 or a portion thereof). Generally, each gain set includes one or more values representing a relationship between an input to the control module 104 and an output of the control module 104. For example, each gain set may include filter gains for filters in the control module 104, such as Kalman filters as further explained herein.

The vehicle system 100 optimizes the gain sets for different driving conditions. For example, various driving conditions may be determined (e.g., identified) prior to gain optimization based on training data and testing data, as further explained below. In various embodiments, the number of different driving conditions may vary depending on system requirements. For example, the vehicle system 100 may utilize three different driving conditions, ten driving conditions, etc. Additionally, the driving conditions may include any suitable type of driving condition, such as a decreased or low surface friction coefficient condition (e.g., a wet, icy, etc. roadway), an increased or high lateral acceleration condition (e.g., a curve in a roadway, etc.), a normal driving condition, etc. In various embodiments, a normal driving condition may refer to a low lateral acceleration in a high friction road where vehicle tires are in a linear region. Then, a set of gains may be optimized for each particular driving condition.

In various embodiments, the gain sets for the control system may be optimized onboard the vehicle 102 itself or external to the vehicle 102. For example, the control module 104 may optimize the gain sets for the control system thereby providing an online/real-time optimization. In other examples, the vehicle system 100 may include an optional control module 122 external to the vehicle 102. In such examples, the control module 122 may be implemented with cloud computing to optimize the gain sets using online data collection. For instance, logged data can be sent to a cloud (e.g., represented by the control module 122) and the optimization process can be run remotely. Then, the control module 122 may transmit the optimized gain sets to the control module 104 of the vehicle 102 (or another specific vehicle) via one or more signals 124. Regardless of where the gain sets are optimized, the control module 104 may store the received gain sets and/or determined gain sets and their associated driving conditions for subsequent use.

The gain sets for the control system may be optimized by the control module 104 and/or the control module 122 in any suitable manner. For example, the control module 104 and/or the control module 122 may implement an optimization (or PSO) algorithm to optimize a gain set (with multiple gains) for each driving condition. In such examples, either control module may receive data sets associated with the driving conditions and then implement the optimization algorithm to optimize the gain sets for the driving conditions based on the received data sets. In various embodiments, the data sets be from an online data collection, such as crowd-sourcing. As example only, the data sets may include similar or different types of data that will be used to determine a current driving condition. For example, the data sets used for optimizing gains may include lateral vehicle acceleration values and vehicle wheel slip ratio values for multiple driving conditions.

In various embodiments, the control module 104 and/or the control module 122 determine optimal values for the different gain sets based on one or more cost function equations. For example, when using an optimization algorithm to optimize gains, points may be randomly distributed in a N-dimensional space (where N is an integer) and a cost function with equations of the control system may be formed to find optimal values of gains associated with the cost function. This cost function can be solved numerically for every particle in the swarm to optimize the values. For instance, if the control system is for velocity estimations of the vehicle 102, the cost function may be solved to determine velocity and position of each particle in the swarm in the N-dimensional space with respect to the global optimum solution. In other examples, the control system may be for another vehicle control state and the cost function may be solved to determine that parameter and related position of each particle in the swarm.

In some examples, when implementing the Particle Swarm (e.g., a non-Jacobian based method), some of the gain combinations may make the system unstable. For example, during the random distribution of points in the N-dimensional space (e.g., a 15-dimensional space, etc.) and adjustment of the points based on the learning, some combinations of the gains may lead to instability. This may result in singularities when solving the equations of the system and an increase in computational cost. In such examples, the control module 104 and/or the control module 122 may implement an algorithm to monitor for singularities in the equations and take mitigating actions in response to detecting such singularities.

For example, one of the control modules 104, 122 may detect a singularity in a portion of the data sets and prevent the optimization algorithm from utilizing an optimization space when determining the optimal values for the gain sets based on the cost function equation. In such examples, the control module may detect a singularity based on a rank of one or more matrices including representative data. If a singularity is detected, the control module may prevent the optimization algorithm from solving the cost function equations, cause the optimization algorithm to move away from such regions which improves the computational efficiency, etc. For instance, gain values of the cost function associated with those particles may be adjusted so that they move away from the regions where the singularity issue is detected. In various embodiments, this can be realized by moving towards the global best particle or the local best particle.

In various embodiments, the cost function equation may include one or more correlation coefficients and root mean squared error (RMSE) components. Combining such components in the cost function equation results in better estimator performance when dealing with larger dimension state dynamics and larger measurement datasets. For example, Equation (1) below represents one example cost function equation (J) for velocity estimations of the vehicle 102 that may be generated by the control module 104 and/or the control module 122. In Equation (1), $$\hat{v}_y^{CE}$$

represents a lateral velocity estimate (e.g., an output of a first model as further explained below), $$\hat{v}_x^{CE}$$

represents a longitudinal velocity estimate (e.g., an output of the first model), $$\hat{v}_y^{BM}$$

represents another lateral velocity estimate (e.g., an output of a second model as further explained below), $$q_{\hat{v}_y^{CE}}, \quad q_{ppmc,\hat{v}_y^{CE}}, \quad q_{\hat{v}_y^{CE}} \quad \text{and} \quad r^k_{PPMC,\hat{v}_y^{CE}}$$

represent gains for the first model, $$q_{\hat{v}_y^{BM}}, \quad q_{ppmc,\hat{v}_y^{CE}} \quad \text{and} \quad r^k_{PPMC\hat{v}_y^{CE}}$$

represent gains for the second model, $v_{y,RTK}$ and $v_{x,RTK}$ are ground truth signals (e.g., reference signals), and U is the number of data points that are available in a signal. For example, if a velocity signal of 1 second with sampling rate of 0.01 second is employed, U will be 100. In this example, the correlation coefficient is a Pearson product-moment correlation coefficient (PPMC), which is a measure of association of two signals (e.g., how much the signatures of the two signals are similar). Additionally, the RMSE components are provided, as represented with the square root functions. Depending on the optimization problem, the values of each term may be adjusted.

$$J = q_{\hat{v}_y^{CE}} \sqrt{\frac{\sum_{i=1}^{U}\left(\hat{v}_y^{CE,i} - v_{y,RTK}^i\right)^2}{U}} + \\ q_{ppmc,\hat{v}_y^{CE}}\left|r^k_{PPMC,\hat{v}_y^{CE}} - 1\right| + q_{\hat{v}_x^{CE}}\sqrt{\frac{\sum_{i=1}^{U}\left(\hat{v}_x^{CE,i} - v_{x,RTK}^i\right)^2}{U}} + \\ q_{\hat{v}_y^{BM}}\sqrt{\frac{\sum_{i=1}^{U}\left(\hat{v}_y^{BM,i} - v_{y,RTK}^i\right)^2}{U}} + q_{ppmc,\hat{v}_y^{CE}}\left|r^k_{PPMC\hat{v}_y^{CE}} - 1\right|$$

Equation (1)

Then, after gain values for each identified driving condition are optimized, the control module 104 may implement a scheduling technique to select appropriate gain values for use in vehicle control. For example, after optimized gain values for identified driving conditions are known, the control module 104 determines a current driving condition associated with the vehicle 102 (e.g., while the vehicle 102 is moving). In various embodiments, the current driving condition may be determined based on one or more vehicle characteristics received or otherwise detected by one or more of the sensors 106, 108, 110. For example, the control module 104 may determine that the current driving condition is a low surface friction coefficient driving condition, or another suitable driving condition based on a lateral acceleration ($a_y$) value provided by one of the sensors 106, 108, 110, slip ratio values for each wheel 114, 116, 118, 120, etc.

Once a current driving condition is determined, the control module 104 then selects a gain set of the optimized collection of gain sets. For example, the control module 104 may store each identified driving condition and its associated optimized gains. Then, after a driving condition is determined, the control module 104 can select a particular set of optimized gains (e.g., gain values) for the determined driving condition. In this way, the set of gains selected are specific to the current driving condition.

Then, the vehicle system 100 may control one or more vehicle operations of the vehicle 102 based on the optimized gain values of the selected gain set. For example, the selected set of optimized gains may then be used with a particular control system for determining a characteristic of the vehicle 102. For instance, the set of optimized gains may be used as filter gains (e.g., Kalman filter gains) in the control system for velocity estimation of the vehicle 102 or another control parameter of the vehicle 102. In such examples, the control module 104 may generate a control signal for the vehicle control module 112 based on the control parameter of the vehicle 102 (e.g., the velocity estimation of the vehicle 102, etc.). The vehicle control module 112 may then control an operation of the vehicle 102, such as a motion and/or a trajectory of the vehicle 102 based on the control signal.

In various embodiments, the complexity of determining optimal values for different gain sets may increase exponentially by adding more dimensions to the N-dimensional space, as explained above. In other words, when more dimensions are added, more gain values are optimized during the optimization process. As such, in some examples, a system can be broken down into smaller independent subsystems, where gain values of each subsystem can be optimized separately. As one example, the independent subsystems may be represented by two or more models, such a kinematic model and a dynamic model. By relying on smaller subsystems for optimizing gain values instead of one system, the optimization process may experience reduced computational cost and faster convergence to global optimum values when using, for example, the optimization process.

Figure 2:
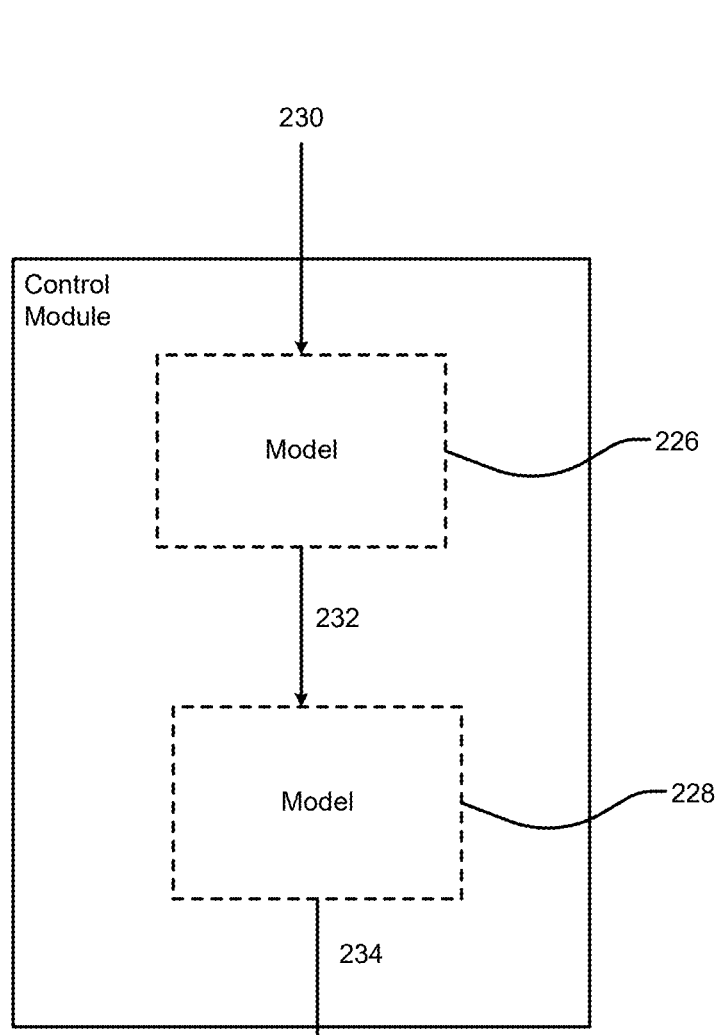
FIG. 2 is a block diagram of an example control module including multiple models, according to the present disclosure.

For example, FIG. 2 depicts one example of a control module 204 that may be employed as or a part of the control module 104 and/or the control module 122 of FIG. 1. As shown, the control module 204 includes two models 226, 228 (e.g., two subsystems). Although FIG. 2 illustrates two models, it should be appreciated that in some examples additional models or subsystem may be employed if desired.

The models 226, 228 may be any suitable model types. For example, the model 226 may be a Kalman filter with a dynamic model, and the model 228 may be a kinematic model. In other examples, any other suitable models may be employed.

In the example of FIG. 2, the control module 204 separately optimizes a first subset of gain sets for the model 226 and another second subset of the gain sets for the model 228. For example, the first subset of the gain sets may be optimized as explained above. During this time, the control module 204 may freeze (e.g., maintain, not change, etc.) gain values (if known) for the second subset. Likewise, when the second subset is optimized, the control module 204 may freeze gain values (if known) for the first subset. With this approach Equation (1) above may be broken into two cost function equations ($J_1$, $J_2$) represented by Equations (2) and (3) below.

$$J_1 = q_{\hat{v}_y^{CE}} \sqrt{\frac{\sum_{i=1}^{U}\left(\hat{v}_y^{CE,i} - v_{y,RTK}^{j}\right)^2}{U}} + \qquad \text{Equation (2)}$$

$$q_{ppmc,\hat{v}_y^{CE}} \left| r_{PPMC,\hat{v}_y}^{k\,CE} - 1 \right| + q_{\hat{v}_x^{CE}} \sqrt{\frac{\sum_{i=1}^{U}\left(\hat{v}_x^{CE,i} - v_{x,RTK}^{j}\right)^2}{U}}$$

$$J_2 = q_{\hat{v}_y^{BM}} \sqrt{\frac{\sum_{i=1}^{U}\left(\hat{v}_y^{BM,i} - v_{y,RTK}^{j}\right)^2}{U}} + \qquad \text{Equation (3)}$$

$$q_{ppmc,\hat{v}_y^{CE}} \left| r_{PPMC\hat{v}_y}^{k\,CE} - 1 \right|$$

In the example of FIG. 2, the control module 204 may rely on an output of one of the models 226, 228 (e.g., subsystems) for determining vehicle control states. For example, and as explained above, a current driving condition may be determined and optimized gain values for that driving condition are selected. In this example, the gain values are broken into two subsets, which were optimized separately for the two different models 226, 228.

Then, and as shown in FIG. 2, the model 226 receives inputs 230, such as one or more vehicle characteristics received or otherwise detected by one or more of the sensors 106, 108, 110 of FIG. 1. The control module 204 can then determine a vehicle control state (e.g., a lateral velocity estimate and a longitudinal velocity estimate) using the model 226 based on the subset of the selected gain values for the model 226 and the received inputs. In this example, the model 226 provides an output 232 representing the vehicle control state to the model 228. The control module 204 then determines a vehicle control state (e.g., a lateral velocity estimate) using the model 228 based on the vehicle control state from the model 226 and the subset of the selected gain values for the model 228. The model 228 may then provide an output 234 representing the vehicle control state (e.g., a lateral velocity estimate). The control module 204 may generate a control signal based on the vehicle control states and/or parameters for control of one or more vehicle operations as explained above.

In various embodiments, fusion logic may be implemented to smoothly transition between different driving conditions and provide superior performance in real-time. For example, the fusion logic may be used to smoothen the transition between control states for different driving conditions and avoid sharp changes in gains which may affect the estimation performance. In some examples, the fusion logic may be implemented with a low pass filter.

Figure 3:
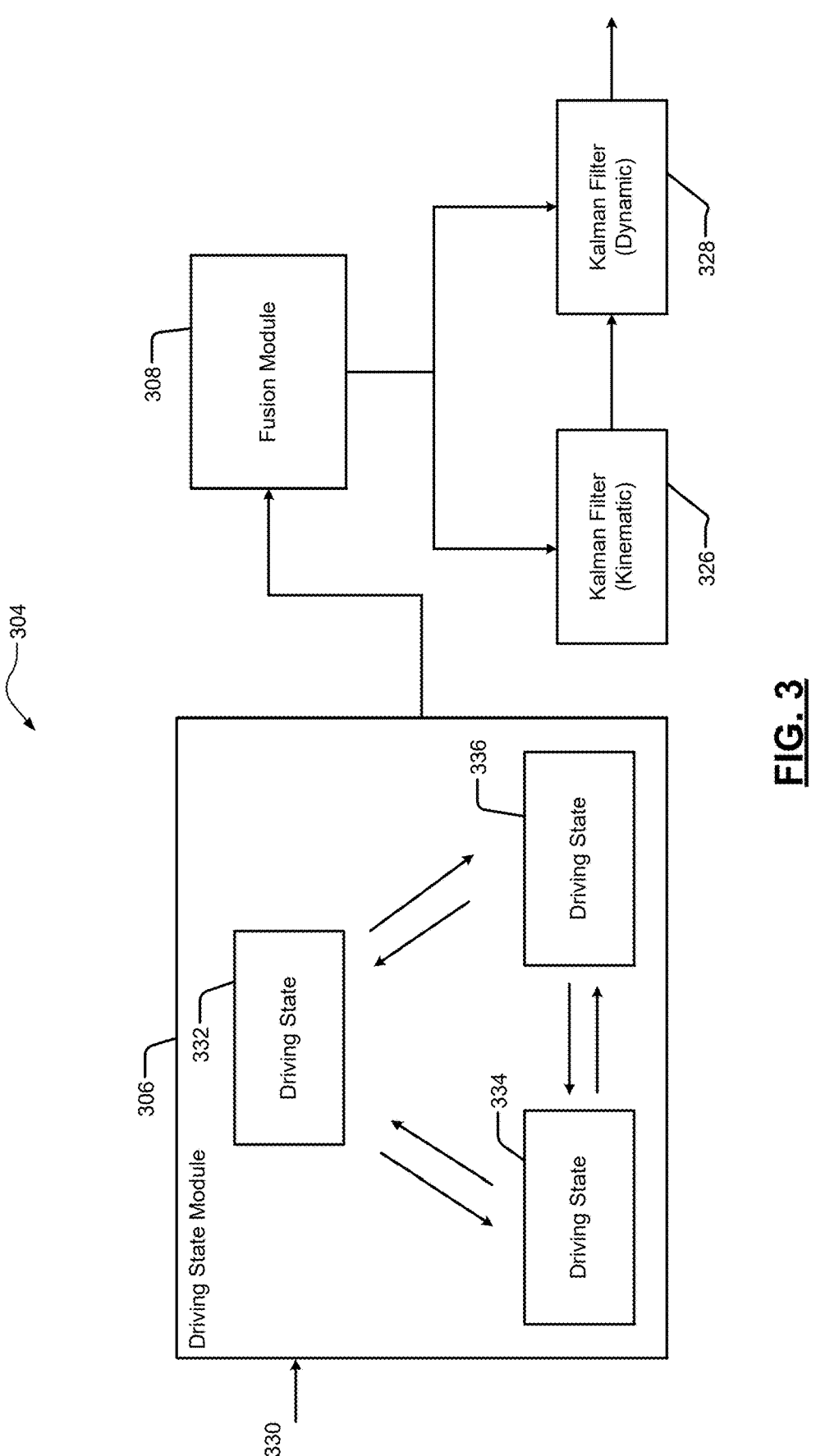
FIG. 3 is a block diagram of an example control module including a fusion module for smoothly transitioning between selected gains when a driving condition changes, according to the present disclosure.

FIG. 3 illustrates one example control module 304 implementing such gain scheduling logic and that may be employed as or a part of the control module 104 of FIG. 1. As shown in FIG. 3, the control module 304 includes a driving state module 306 for determining a current driving condition and corresponding control state, a fusion module 308 for smoothly transitioning between selected gains when the driving condition changes, and models 326, 328. In the example of FIG. 3, the models 326, 328 may be similar to the models 226, 228 of FIG. 2. For example, the model 326 may be a kinematic model, and the model 328 may be a dynamic model.

In the example of FIG. 3, the driving state module 306 receives various inputs 330, such as one or more vehicle characteristics received or otherwise detected by one or more of the sensors 106, 108, 110 of FIG. 1. In various embodiments, the inputs 330 may include, for example, a lateral acceleration ($a_y$) value, slip ratio values for each vehicle wheel, etc.

Then, based on the received inputs 330, the driving state module 306 determines a current driving condition and corresponding control state. For example, the driving state module 306 is shown as including three driving control states 332, 334, 336 corresponding to three driving conditions. In various embodiments, the driving conditions may include a normal operating condition, a low surface friction condition, a high lateral acceleration condition, or other suitable driving conditions. While the example of FIG. 3 illustrates three driving control states 332, 334, 336 corresponding to three driving conditions, it should be appreciated that more or less driving control states and corresponding driving conditions may be employed if desired.

In such examples, the driving state module 306 may initially begin in one of the driving states 332, 334, 336, such as a driving state corresponding to a normal operating condition. In such examples, the control module 304 may select an appropriate set of optimized gain values for that driving condition for use by the models 326, 328, as explained above. For example, the control module 304 may provide one subset of the selected optimized gain values for the model 326 and another subset of the selected optimized gain values for the model 328, as indicated by arrows between the fusion module 308 and the models 326, 338. In various embodiments, the selected gain values for the driving condition may pass through the fusion module 308 without disturbance.

If, however, the driving condition changes, the control module 304 transitions to another one of the driving states 332, 334, 336. For example, the driving state module 304 may then transition to a different one of the driving control states 332, 334, 336 when a new driving condition is determined based on the received inputs 330. For instance, if the received inputs 330 satisfy a particular set of conditions (e.g., thresholds), the driving state module 304 may determine a new current driving condition and transition from one state (e.g., the driving control state 332) to another state (e.g., the driving control state 334 or the driving control state 336). Once a new current driving condition is determined, the control module 304 selects a new set of optimized gain values for that driving condition. In such examples, the driving state module 304 may pass the new driving control state and/or the newly selected optimized gain values to the fusion module 308.

Then, the fusion module 308 may blend the first set of optimized gain values for the previous driving condition into the new set of optimized gain values for the new driving condition to provide a smooth transition. In various embodiments, the fusion module 308 may include one or more components, such as a low pass filter, etc. for incrementally changing the gains from one set of values to another set of values.

Once the optimized gain values are blended into the new set of optimized gain values by the fusion module 308, subsets of the new optimized gain values are provided to the models 326, 338. This is represented by the arrows between the fusion module 308 and the models 326, 338. For instance, one subset of the selected optimized gain values is provided for the model 326 and another subset of the selected optimized gain values is provided for the model 328.

The models 326, 328 then determine vehicle control states in a similar manner as the models 226, 228 of FIG. 2. For instance, the model 326 determines a vehicle control state (e.g., a lateral velocity estimate and a longitudinal velocity estimate) based on its subset of optimized gain values and outputs the vehicle control state to the model 328. Then, the model 328 determines a vehicle control state (e.g., a lateral velocity estimate) based on the vehicle control state from the model 326 and its subset of optimized gain values. The model 328 then provides an output representing the vehicle control state (e.g., a lateral velocity estimate), which can be used to generate a control signal for controlling one or more vehicle operations as explained above.

Figure 4:
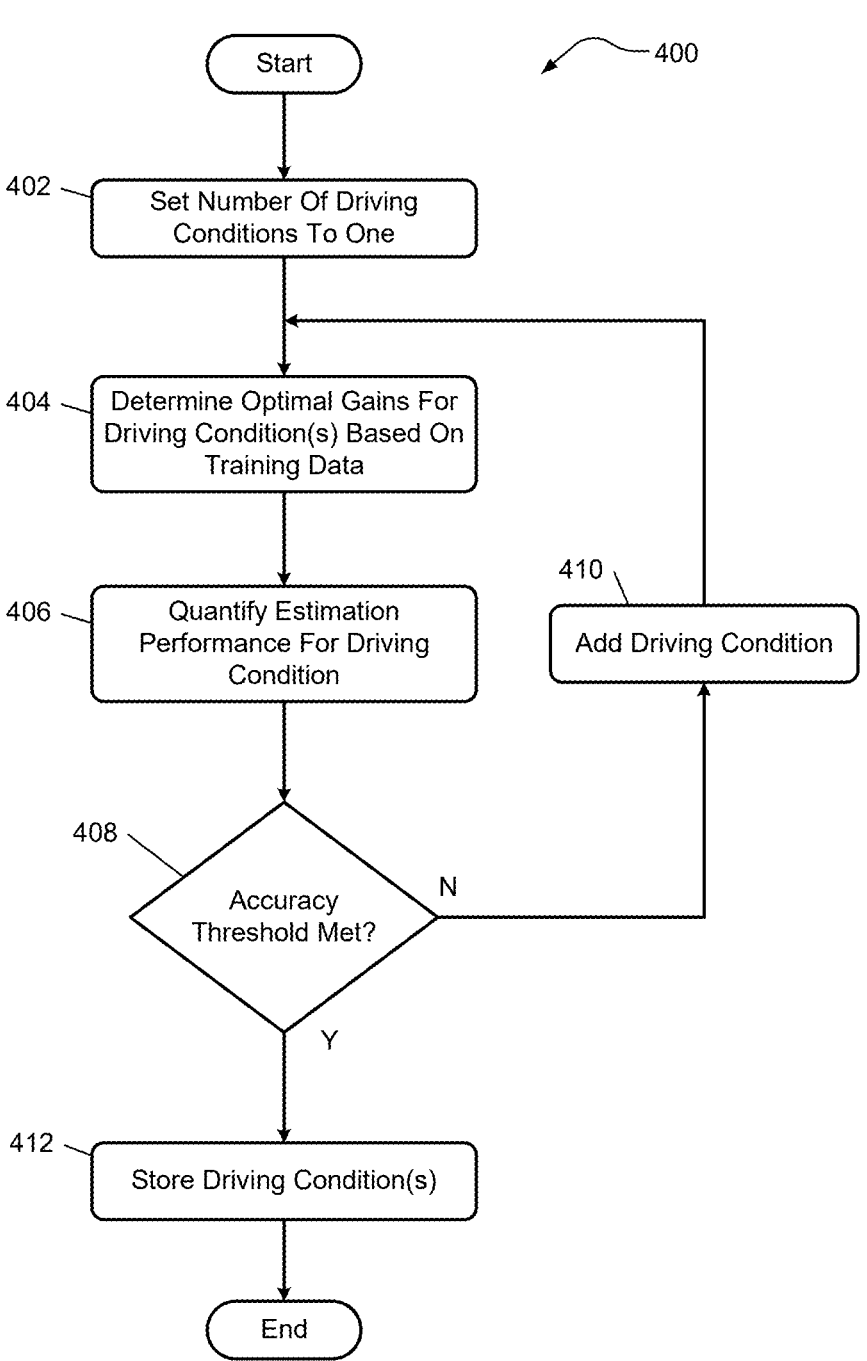
FIG. 4 is a flowchart of an example control process for identifying driving conditions, according to the present disclosure.
Figure 5:
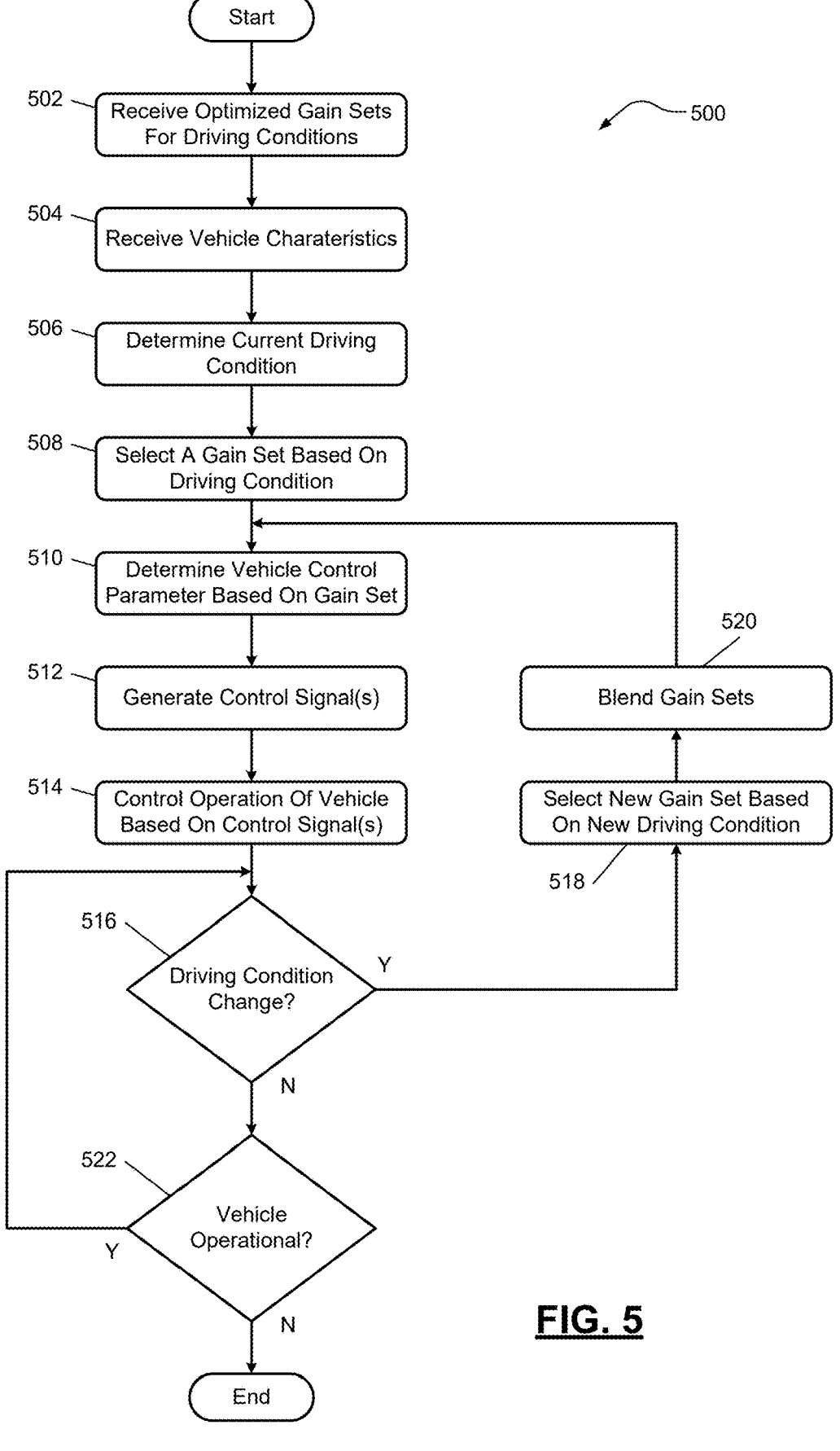
FIGS. 5-6 are flowcharts of example control processes for selecting a gain set from a group of optimized gain sets for controlling a vehicle, according to the present disclosure.
Figure 6:
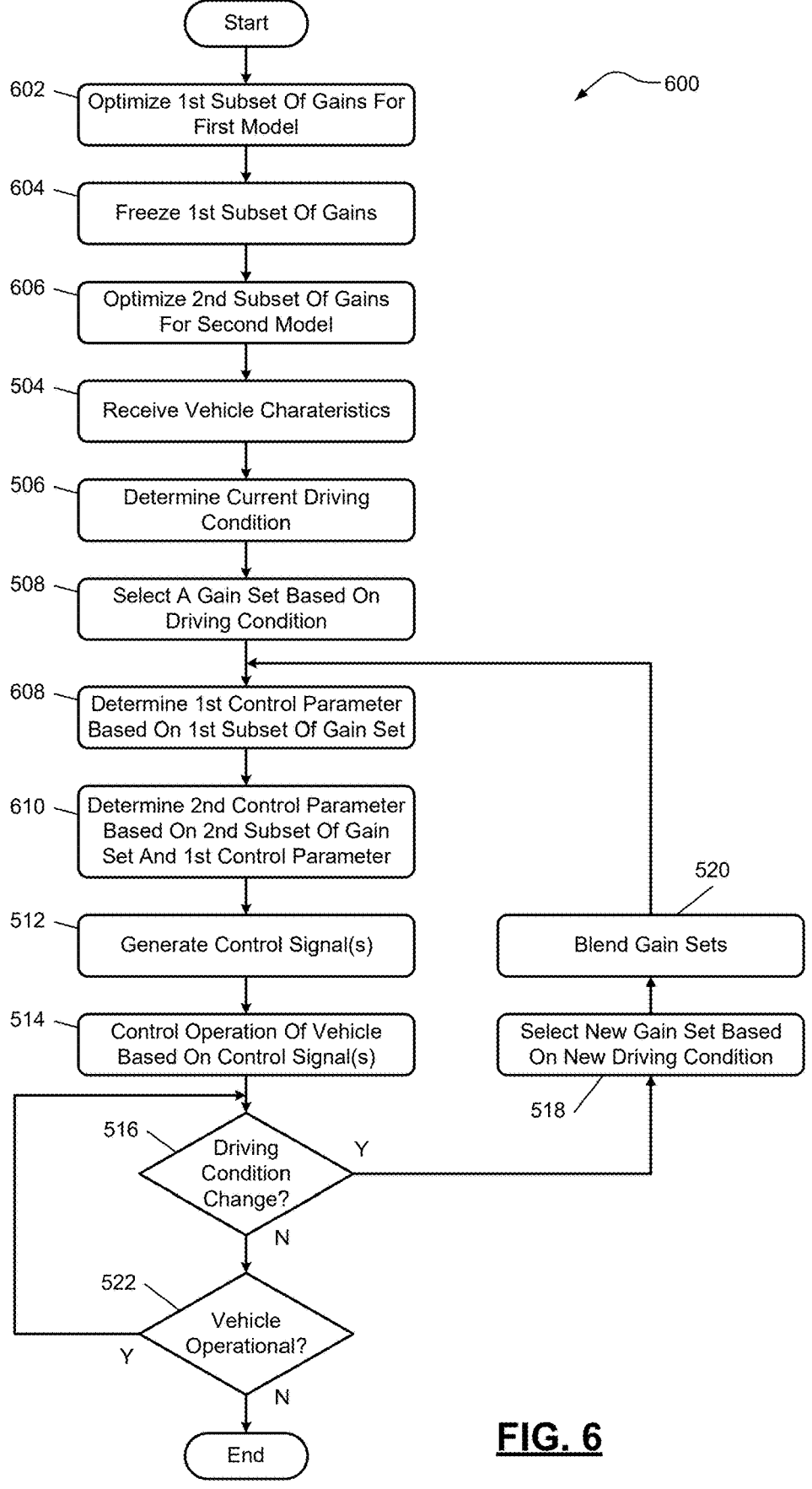

FIG. 4 illustrates an example control process 400 employable by the vehicle system 100 of FIG. 1 for identifying or determining driving conditions, and FIGS. 5-6 illustrate example control processes 500, 600 employable by the vehicle system 100 of FIG. 1 for selecting a gain set from a group of optimized gain sets for controlling a vehicle. Although the example control processes 400, 500, 600 are described in relation to the vehicle system 100, the control module 104, the vehicle 102 of FIG. 1, any one of the control processes 400, 500, 600 may be employable by another suitable vehicle system, control module, and/or vehicle.

As shown in FIG. 4, the control process 400 begins at 402 by setting a number of driving conditions to one. The control process 400 then proceeds to 404. At 404, control determines optimal gains for the driving condition (e.g., a normal operating condition). In various embodiments, the control module 104 and/or the control module 122 of FIG. 1 may be employed to determine optimal gain values for this driving condition as explained above. The control process 400 then proceeds to 406.

At 406, control quantifies an estimation performance determined based on the determined optimal gain values for the driving condition. In various embodiments, the estimation performance may be quantified according to conventional techniques. The control process 400 then proceeds to 408, where control determines whether an accuracy threshold for the estimation performance is met. For example, the control module 104 may compare the quantified estimation performance obtained in 406 to one or more thresholds. If the accuracy threshold is not met (e.g., the quantified estimation performance is less than a threshold), control proceeds to 410.

At 410, control adds another driving condition to the set. For example, if the initial driving condition was a normal operating condition, a low surface friction condition and/or a high surface friction condition may be added to differentiate from the normal operating condition. Then, the control process 400 returns to 404 where control determines optimal gains for each driving condition (e.g., a normal operating condition and a low surface friction condition). The control process 400 then proceeds again to 406 where control quantifies estimation performances determined based on the determined optimal gain values for the driving conditions. Then, the control process 400 proceeds to 408 again, where control determines whether accuracy thresholds for the estimation performances are met as explained above. This cycle of adding new driving conditions repeats until the accuracy thresholds are met. Once the accuracy thresholds are met (e.g., the quantified estimation performances are smaller than a threshold), control proceeds to 412 where the driving condition(s) may be stored for subsequent use. The control process 400 then ends as shown in FIG. 4.

In FIG. 5, the control process 500 begins at 502 by receiving optimized gain sets for different driving conditions. In various embodiments, the driving conditions may be determined with the control process 400 of FIG. 4, may be predefined, etc. Additionally, and as explained above, the control module 122 of FIG. 1 may optimize a set of gain values for each driving condition and then transmit the optimized gain values for the different driving conditions to the control module 104 of the vehicle 102. In such examples, the gain values may be optimized based on collected data sets from multiple different vehicles including or not including the vehicle 102. With this configuration, the gain values may be optimized offline and remote from the vehicle 102. In other examples, the control module 104 may receive the optimized gain sets (or gain values) from an internal source (e.g., another control module in the vehicle 102 similar to the control module 104). In such cases, the gain values may be optimized based on collected data sets from the vehicle 102 and in real-time. In either example, the gain values may be optimized by implementing an optimization algorithm, splitting a control system into independent subsystems, etc. as explained above. The control process 500 then proceeds to 504.

At 504, the control module 104 receives vehicle characteristics. For example, and as explained above, the sensors 106, 108, 110 of FIG. 1 and/or other suitable sensors associated with the vehicle 102 may detect vehicle characteristics, such as acceleration (e.g., lateral acceleration, longitudinal acceleration, etc.), an angular velocity of each wheel 114, 116, 118, 120, etc. The control module 104 may then use parts of the received vehicle characteristics and/or other known characteristics to determine other vehicle characteristics, such as wheel slip ratios for each wheel 114, 116, 118, 120. The control process 500 then proceeds to 506.

At 506, the control module 104 determines a current driving condition associated with the vehicle 102 based on the received and/or determined vehicle characteristics. For example, based on a lateral acceleration of the vehicle 102, wheel slip ratios of the wheels 114, 116, 118, 120, and/or other possible vehicle characteristics, the control module 104 can determine a current driving condition, such as, for example, a normal operating condition, a low surface friction condition, a high lateral acceleration condition, or another suitable driving condition. In various embodiments, the current driving condition is one of the driving conditions determined with the control process 400 of FIG. 4, one of the predefined driving conditions, etc. The control process 500 then proceeds to 508.

At 508, the control module 104 selects a gain set of the group of optimized gain sets based on the driving condition associated with the vehicle 102. For example, if the current driving condition is a first driving condition (e.g., a low surface friction condition), the control module 104 may select a first set of optimized gain values (e.g., filter gains). If, however, the current driving condition is a second driving condition (e.g., a high lateral acceleration condition), the control module 104 may select a second set of optimized gain values different than the first set of optimized gain values. The control process 500 then proceeds to 510.

At 510, the control module 104 determines one or more vehicle control states (e.g., a lateral velocity estimate) of the vehicle 102. For example, the optimized gain values and vehicle characteristics (e.g., the received and/or determined vehicle characteristics) may be used by one or more filters in the control module 104 and/or another control system to determine a vehicle control state (e.g., a lateral velocity estimate) of the vehicle 102.

In various embodiments, the control system may be split into two or more independent subsystems, as explained above. In such examples, the control module 104 may select a particular set of optimized gain values at 508, with a subset of the optimized gain values being employed by each subsystem (e.g., each filter). For example, if two subsystems are employed (e.g., during optimization and vehicle control), a first subsystem or model can determine one or more vehicle control states (e.g., a lateral velocity estimate and a longitudinal velocity estimate) based on the subset of selected gain values for the first model and vehicle characteristics, at 510. Then, a second subsystem or model can determine a vehicle control state (e.g., a lateral velocity estimate) based on the subset of selected gain values for the second model and an output of the first model (e.g., the one or more vehicle control states), at 510.

The control process 500 then proceeds to 512, where the control module 104 generates a control signal based on the vehicle control state (e.g., a lateral velocity estimate). Then, the control module 104 may transmit the control signal to the vehicle control module 112. The control process 500 then proceeds to 514, where the vehicle control module 112 controls at least one operation of the vehicle 102 based on the control signal. The control process 500 then proceeds to 516.

At 516, the control module 104 determines whether a current driving condition has changed. This determination may be made based on the received and/or determined vehicle characteristics. For example, the control module 104 may periodically, randomly, substantially continuously, etc. determine a current driving condition associated with the vehicle 102, as explained above. If a current or new driving condition is determined to be different than the previous driving condition (e.g., a change in the driving condition is detected), the control process 500 proceeds to 518. If, however, no change is detected, the control process 500 proceeds to 522.

At 518, the control module 104 selects a new set of optimized gain values based on the new driving condition associated with the vehicle 102. In various embodiments, and as explained above, the optimized gain values may include subsets for independent subsystems. The control process 500 proceeds to 520.

At 520, the control module 104 blends the optimized gain values for the previous driving condition into the new optimized gain values for the new driving condition to provide a smooth transition. In various embodiments, the control module 104 may include one or more components, such as a low pass filter, etc. for incrementally changing the gains from one set of values to another set of values. The control process 500 then returns to 510.

At 522, the control module 104 determines whether the vehicle is operational. For example, the control module 104 may receive a signal when the vehicle 102 is in a power on mode, moving, etc. If the control module 104 determines that the vehicle is operational (e.g., is not in a power on mode), the control process 500 returns to 516. Otherwise, if the control module 104 determines that the vehicle is not operational, the control process 500 may end as shown in FIG. 5.

In FIG. 6, the control process 600 is similar to the control process 500 of FIG. 5 but includes additional steps. For example, and as shown in FIG. 6, the process 600 begins at 602, where the gain sets for different driving conditions are optimized. More specifically, at 602, the control module 104 optimizes, for each driving condition, a first subset of gain values for a first model (e.g. a first subsystem) in the control module 104. The control process 600 then proceeds to 604 and 606. At 604, the control module 104 freezes the first subset of optimized gain values, and at 606, the control module 104 optimizes, for each driving condition, a second subset of gain values for a second model (e.g. a second subsystem) in the control module 104. In such examples, the driving conditions may be determined with the control process 400 of FIG. 4, may be predefined, etc., and the gain values may be optimized (separately) by implementing an optimization algorithm, etc. as explained above.

The control process 600 of FIG. 6 then proceeds to 504, 506, 508 as explained above relative to FIG. 5. Next, the control process 600 proceeds to 608, 610.

At 608, the control module 104 determines one or more first vehicle control states based on the first subset of optimized gain values. For example, and as explained above, the first model (e.g., the model 226 of FIG. 2, the model 326 of FIG. 3, etc.) of the control module 104 may determine one or more vehicle control states (e.g., a lateral velocity estimate and a longitudinal velocity estimate) based on the first subset of optimized gain values and vehicle characteristics.

At 610, the control module 104 determines one or more second vehicle control states. For example, and as explained above, the second model (e.g., the model 228 of FIG. 2, the model 328 of FIG. 3, etc.) of the control module 104 may determine one or more vehicle control states (e.g., a lateral velocity estimate) based on the second subset of optimized gain values and the one or more first vehicle control states.

Then, the control process 600 of FIG. 6 proceeds to 512, 514, 516, 518, 520, 522 as explained above relative to FIG. 5.

The vehicle systems and methods herein provide numerous benefits. For example, multiple sets of gains, as opposed to one set, are optimized and used for different driving conditions (e.g., in real-time). As such, the various sets of gains may cover most (if not all) of the edge cases of vehicle dynamics conditions. Additionally, because a PSO optimization technique may be employed to optimize the gains of the extended Kalman filters using experimental data from different conditions, each set of gains may be optimized with a high degree of accuracy for each of the vehicle dynamic cases. Further, because a control system can be broken down into smaller independent subsystems, where gain values of each subsystem can be optimized separately, reduced computational costs and faster convergence to global optimum values may be realized as compared to a single control system. Also, the vehicle systems and methods herein provide for smooth transitions between optimized gain values for different driving conditions to enable smooth transitions between operating conditions and provide superior and robust performance in real-time. In addition, computational efficiency of the optimization algorithm is enhanced by incorporating a singularity check in the data and avoiding regions that may cause issues. This leads to a reduced computational burden associated with the optimization algorithm and faster convergence to a global minimum as more "good" particles are considered in the computation. Additionally, the vehicle systems and methods herein provide flexibility as some or all of the aspects described herein may be executed on the vehicle (e.g., in real time) and/or external to the vehicle, thereby enabling the acquisition of customized parameters to suit specific vehicle requirements. In other words, this flexibility provides customizability of the gains to the specific vehicles.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A vehicle system for selecting a gain set for controlling a vehicle, the vehicle system comprising:
    a plurality of sensors configured to detect one or more vehicle characteristics; and
    a control module in communication with the plurality of sensors, the control module configured to:
        optimize a plurality of gain sets for a plurality of different driving conditions, each gain set including one or more values representing a relationship between an input to the control module and an output of the control module;
        determine a first current driving condition associated with the vehicle based on the one or more vehicle characteristics;
        select a first gain set of the plurality of optimized gain sets based on the first current driving condition associated with the vehicle;
        determine a second current driving condition associated with the vehicle based on the one or more vehicle characteristics;
        select a second gain set of the plurality of optimized gain sets based on the determined second driving condition associated with the vehicle;
        blend the first gain set into the second gain set to provide a smooth transition; and
        generate a control signal based on one or more values of the second gain set for controlling at least one operation of the vehicle.

2. The vehicle system of claim 1, wherein the control module is configured to receive data sets associated with the plurality of driving conditions and optimize, with an optimization algorithm, a cost function based on a performance of an estimator for the plurality of gain sets for the plurality of driving conditions based on the received data sets.

3. The vehicle system of claim 2, wherein the data sets include a lateral vehicle acceleration value and a vehicle wheel slip ratio value for each driving condition.

4. The vehicle system of claim 2, wherein the control module is configured to determine optimal values for the plurality of gain sets based on a cost function equation having a correlation coefficient and a root mean squared error (RMSE) component.

5. The vehicle system of claim 4, wherein the control module is configured to detect a singularity in a portion of the data sets and prevent the optimization algorithm from utilizing the portion of an optimization space when determining the optimal values for the plurality of gain sets based on the cost function equation.

6. The vehicle system of claim 1, wherein:
    the control module includes a first model and a second model; and
    the control module is configured to separately optimize a first subset of the plurality of gain sets for the first model and a second subset of the plurality of gain sets for the second model.

7. The vehicle system of claim 6, wherein the first model is a dynamic model and the second model is a kinematic model.

8. The vehicle system of claim 6, wherein the control module is configured to freeze the first subset of the plurality of gain sets and optimize the second subset of the plurality of gain sets for the second model while the first subset are frozen.

9. The vehicle system of claim 6, wherein the control module is configured to:
    determine a first vehicle control state using the first model based on the first subset of the plurality of gain sets;
    determine a second vehicle control state using the second model based on the first vehicle control state and the second subset of the plurality of gain sets; and
    generate the control signal based on the second vehicle control state.

10. The vehicle system of claim 9, wherein the second vehicle control state is a lateral velocity estimate.

11. The vehicle system of claim 1, wherein the one or more vehicle characteristics include a lateral acceleration value for the vehicle and a slip ratio value for each wheel of the vehicle.

12. The vehicle system of claim 1, wherein the driving conditions include one or more of a decreased surface friction coefficient condition, an increased lateral acceleration condition, and a normal driving condition.

13. A vehicle system for selecting a gain set for controlling a vehicle, the vehicle system comprising:
    a plurality of sensors configured to detect one or more vehicle characteristics; and
    a control module in communication with the plurality of sensors and including a first model and a second model, the control module configured to:
        receive a plurality of optimized gain sets for a plurality of different driving conditions, each gain set including one or more values representing a relationship between an input to the control module and an output of the control module;
        determine a current driving condition associated with the vehicle based on the one or more vehicle characteristics;
        select a gain set of the plurality of optimized gain sets based on the current driving condition associated with the vehicle, the selected gain set including a first subset for the first model and a second subset for the second model;
        determine a first vehicle control state using the first model based on the first subset of the gain set,
        determine a second vehicle control state using the second model based on the first vehicle control state and the second subset of the gain set, and
        generate a control signal based on the second vehicle control state for controlling at least one operation of the vehicle.

14. The vehicle system of claim 13, wherein:
    the control module is a first control module internal to the vehicle;
    the vehicle system further includes a second control module external to the vehicle; and
    the second control module is configured to optimize the plurality of gain sets for the plurality of different driving conditions and transmit the plurality of optimized gain sets to the first control module.

15. The vehicle system of claim 13, wherein the first model is a dynamic model and the second model is a kinematic model.

16. The vehicle system of claim 13, wherein:
    the current driving condition is a first current driving condition;
    the gain set of the plurality of optimized gain sets is a first gain set; and the control module is configured to:

determine a second current driving condition associated with the vehicle based on the one or more vehicle characteristics;

select a second gain set of the plurality of optimized gain sets based on the determined second driving condition associated with the vehicle;

blend the first gain set into the second gain set to provide a smooth transition; and generate the control signal based on one or more values of the second gain set for controlling at least one operation of the vehicle.

17. The vehicle system of claim 13, wherein:

the one or more vehicle characteristics include a lateral acceleration value for the vehicle and a slip ratio value for each wheel of the vehicle; and the driving conditions include one or more of a decreased surface friction coefficient condition, an increased lateral acceleration condition, and a normal driving condition.

18. A control method for selecting a gain set for controlling a vehicle, the control method comprising:

optimizing a plurality of gain sets for a plurality of different driving conditions, including separately optimizing a first subset of the plurality of gain sets for a first model and a second subset of the plurality of gain sets for a second model;

determining a current driving condition associated with the vehicle based on one or more vehicle characteristics;

selecting a gain set of the plurality of optimized gain sets based on the determined driving condition associated with the vehicle;

determine a first vehicle control state using the first model based on the first subset of the plurality of gain sets;

determine a second vehicle control state using the second model based on the first vehicle control state and the second subset of the plurality of gain sets; and generating a control signal based on the second vehicle control state for controlling at least one operation of the vehicle.

19. The control method of claim 18, wherein separately optimizing the first subset of the plurality of gain sets and the second subset of the plurality of gain sets includes freezing the first subset of the plurality of gain sets and optimizing the second subset of the plurality of gain sets while the first subset are frozen.

20. The control method of claim 18, wherein:

the first model is a dynamic model and the second model is a kinematic model; and the second vehicle control state is a lateral velocity estimate.

\* \* \* \* \*